United States Patent Office 3,420,428
Patented Jan. 7, 1969

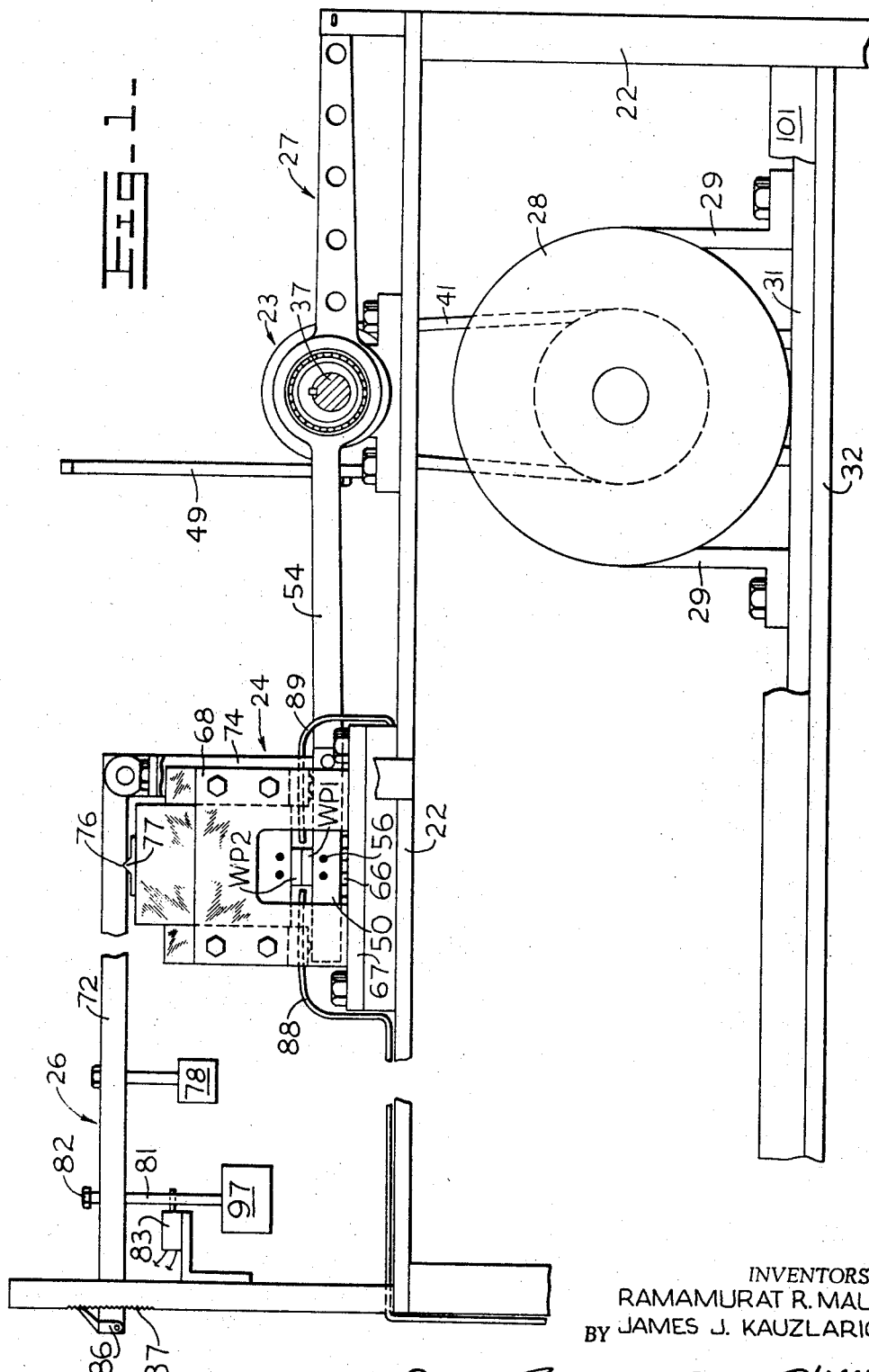

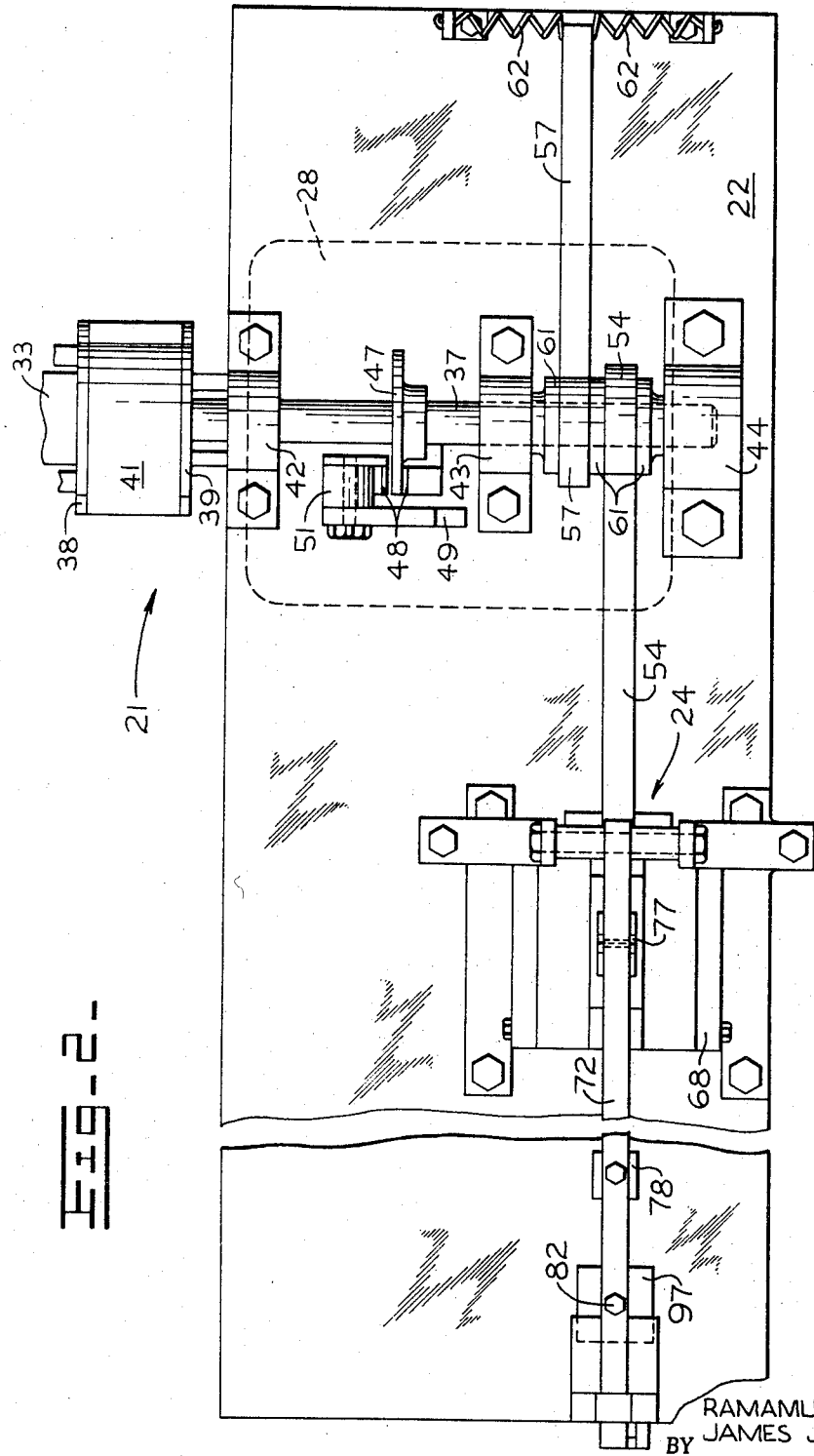

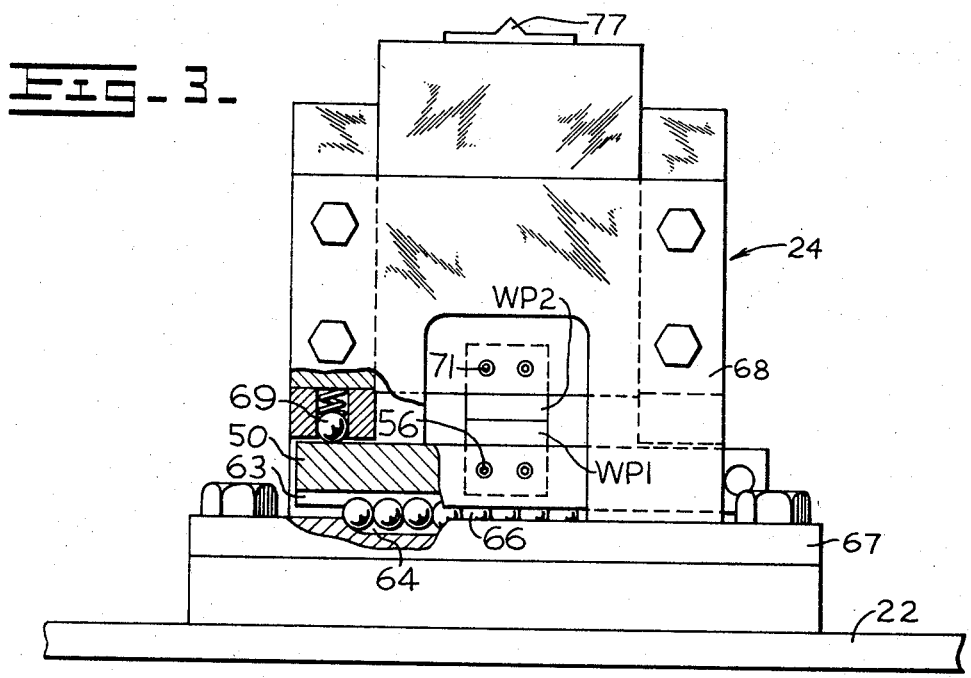
Fig-3-
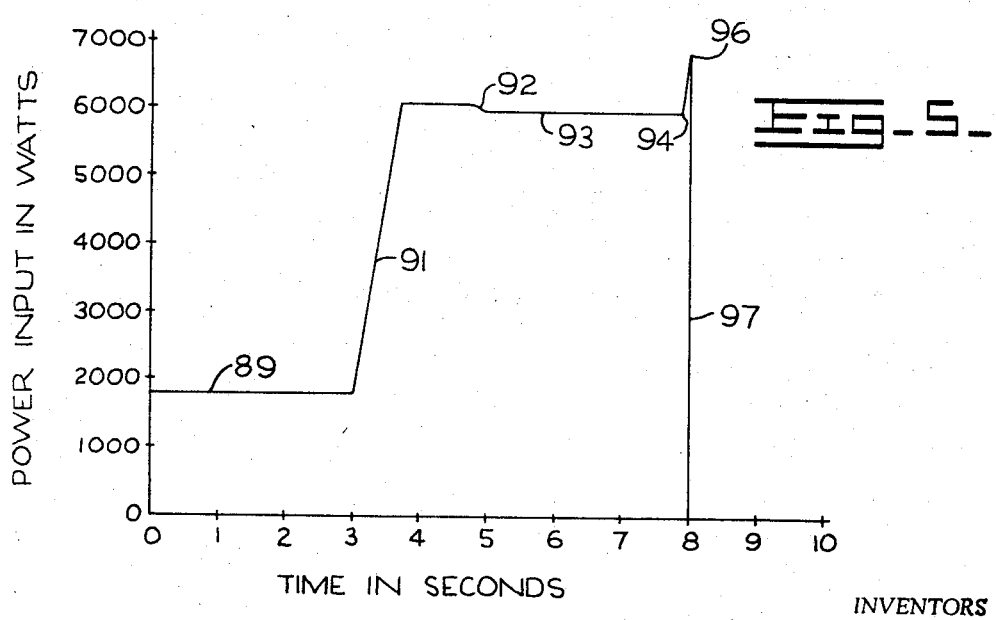
Fig-5-
INVENTORS
RAMAMURAT R. MAURYA
BY JAMES J. KAUZLARICH
ATTORNEYS

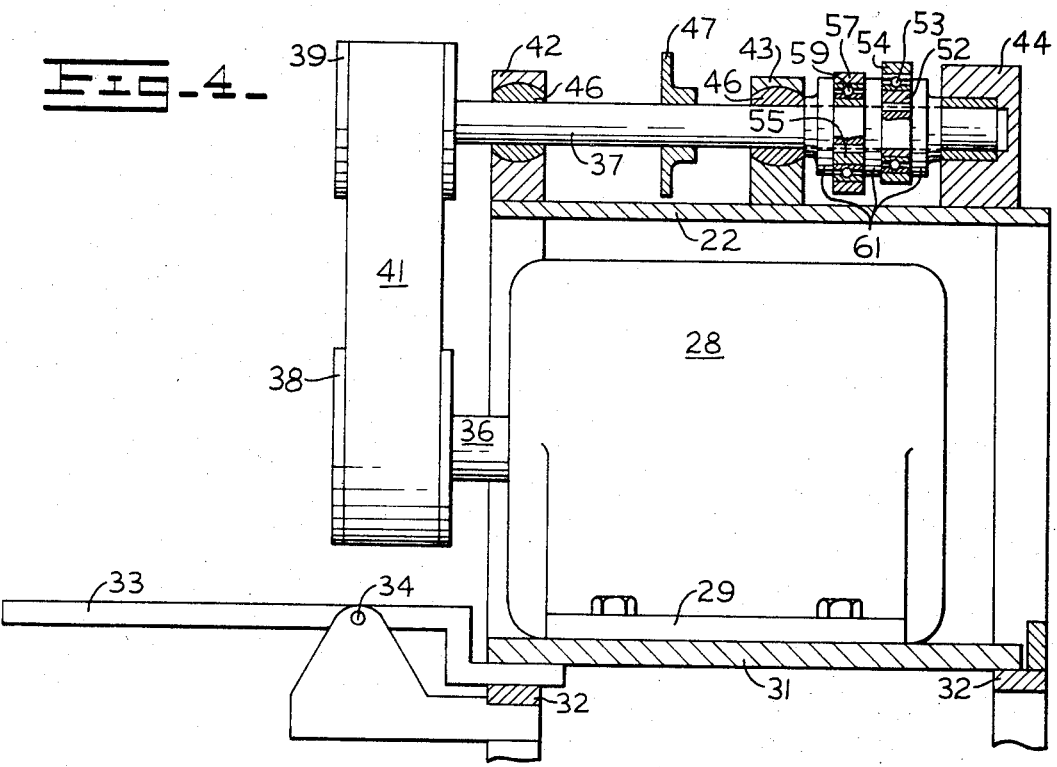
Fig-4-
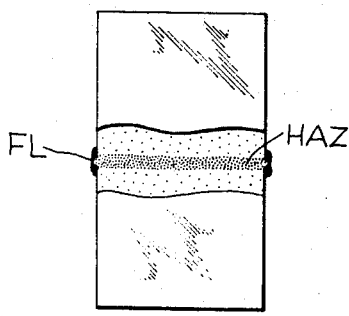
Fig-6-
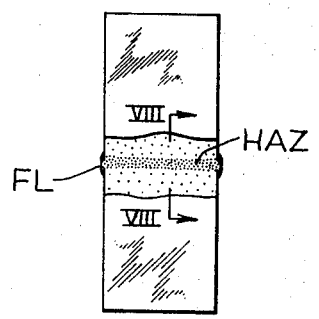
Fig-7-
INVENTORS
RAMAMURAT R. MAURYA
BY JAMES J. KAUZLARICH
ATTORNEYS

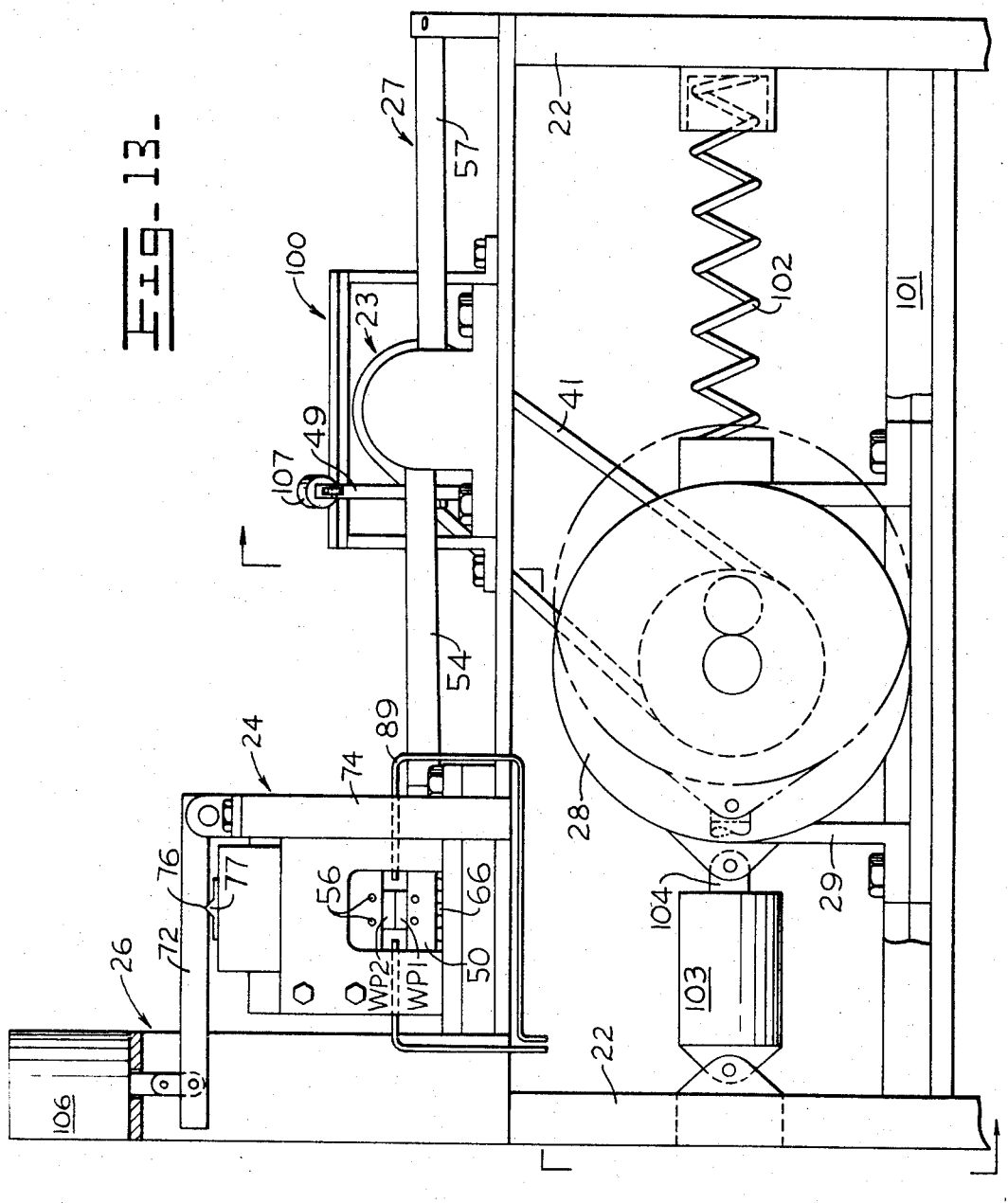

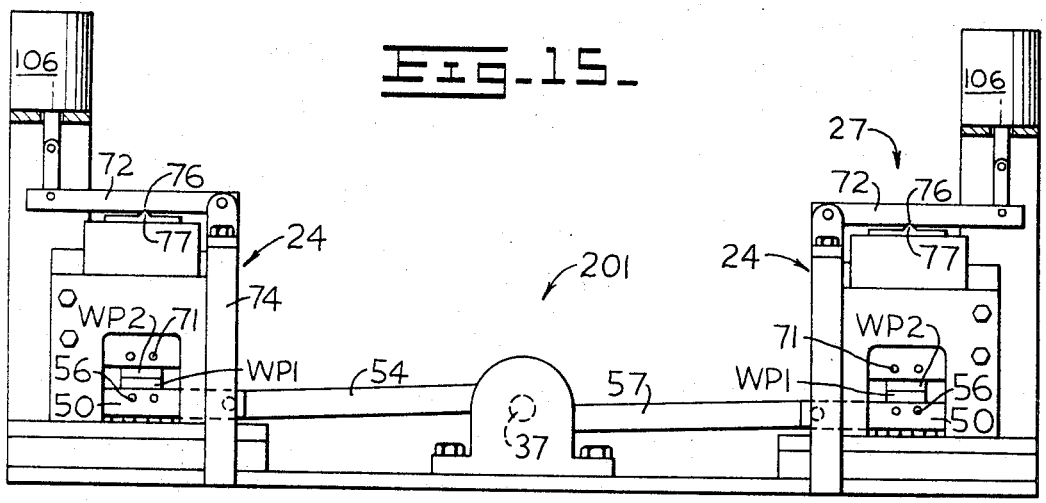
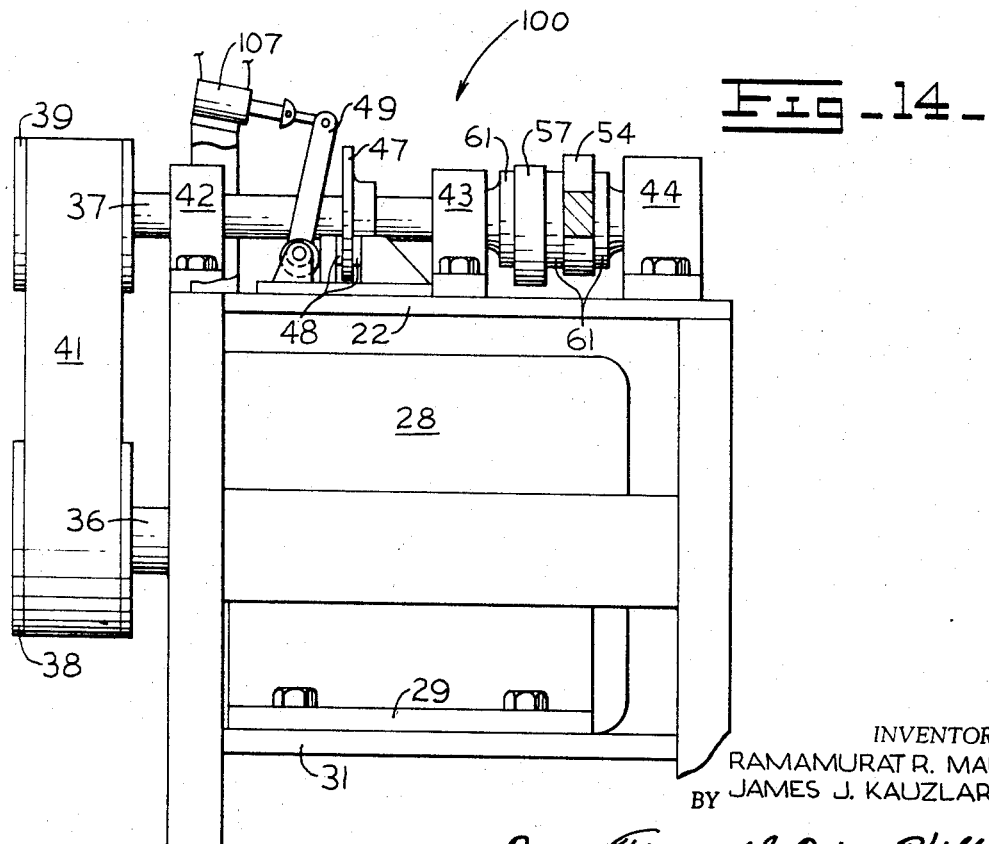

3,420,428
RECIPROCATING FRICTION BONDING APPARATUS
Ramamurat R. Maurya, Peoria, Ill., and James J. Kauzlarich, Charlottesville, Va., assignors to Caterpillar Tractor Co., Peoria, Ill., a corporation of California
Filed Oct. 21, 1965, Ser. No. 499,249
U.S. Cl. 228—2         4 Claims
Int. Cl. B23k 27/00

ABSTRACT OF THE DISCLOSURE

Metal parts are welded together by engaging the parts in reciprocatory rubbing contact at a common interface. The frequency of reciprocation, axial load, speed and time of rubbing contact are controlled and correlated to produce a substantial zone of plastic material at the interface. The parts are driven in reciprocatory rubbing contact to a condition in which the power input stabilizes as a result of the plastic condition at the interface, and the process is then stopped while the parts are pressed together with sufficient force to squeeze plastic material from the interface as external flash.

---

This invention relates to methods and apparatus for bonding parts by engaging the parts in rubbing contact to heat and to work the interface to a bondable condition. This invention relates specifically to a method and apparatus for bonding parts by engaging the parts in reciprocating rubbing contact.

As a result of the publication of Russian articles by V. I. Vill describing methods and equipment for the friction welding of rods and tubes by rotating the ends of the rods and tubes in frictional engagement there has been a great deal of recent activity in this general method of joining parts. Process parameters have been rapidly developed for joining a wide variety of materials, including dissimilar metals that had previously been considered hard to join.

This process, as developed prior to the present invention, has however been limited to the joining of parts that could be rotated with respect to one another. At least one of the parts has had to have a generally circular cross section at the weld interface.

The workers in this field quickly recognized the seriousness of this limitation of the rotational technique, and a process for developing the necessary heat by reciprocating motion, rather than by rotary motion, has been proposed in general terms by a number of investigators. See, for example, Fig. 1(d) on page 2 of the book entitled "Friction Welding of Metals" by V. I. Vill and translated from Russian articles by the American Welding Society, Inc., and also German Patent No. 476,480 to Richter. However, the problems in achieving the intended results by means of reciprocatory motion prevented development of this general concept. Thus, prior to the present invention there has not been a disclosure of process parameters or mechanism effective to accomplish the desired result.

Prior to the present invention the status of welding by reciprocating motion was well summarized by the following statement from page 3 of the above-noted book by Vill: "Friction welding of two pieces by means of reciprocating motion of the contact surfaces has been suggested, but future application of this scheme is very doubtful."

It is therefore a primary object of the present invention to bond parts by rubbing the parts together in reciprocatory motion across a common interface. In accordance with the present invention the parts are engaged under sufficient pressure and the frequency of the reciprocatory motion is quick enough and the period of time that the parts are rubbed together is long enough to heat and to work the interface to a plastic condition. When this occurs, the parts are pressed together as the reciprocatory motion ends with a sufficient force to squeeze plastic material out of the interface zone in the form of external flash.

The reciprocatory motion is introduced in a direction parallel to the interface and may preferably be produced by converting the rotary motion of a motor to oscillatory motion of a connecting rod and eccentric or crank connected to the output shaft of the motor. The loads and the vibration on the motion imparting mechanism produced by this arrangement can be considerable. It is another object of the present invention to balance such loads and vibrations by a balancing mechanism which moves in opposition to the connecting rod which reciprocates one of the parts to be joined.

The parts to be bonded may be enclosed in an enclosure filled with inert gas to prevent oxidation of the heated surfaces exposed to the atmosphere as a result of the reciprocatory motion. The pressure of engagement can be increased as the reciprocation ends, and a brake may be used to help stop the reciprocatory motion. Methods and apparatus which incorporate these features constitute further specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is front elevation view of a machine for bonding parts by reciprocating motion constructed in accordance with one embodiment of the present invention;

FIG. 2 is a top plan view of the machine shown in FIG. 1;

FIG. 3 is an enlarged front elevation view of the part-holding fixture of the machine shown in FIG. 1 with a portion of the fixture broken away and in section to show details of construction;

FIG. 4 is an end elevation view taken along the line and in the direction indicated by the arrows 4—4 in FIG 1 showing details of the eccentrics for converting rotary motion to reciprocatory motion;

FIG. 5 is a plot of the power input versus time curve for a normal cycle of operation of the machine shown in FIG. 1;

FIG. 6 is a pictorial front elevation view, partly broken away through the bond zone, of two parts bonded by the machine shown in FIG. 1;

FIG. 7 is an end elevation view of the bonded parts shown in FIG. 6;

FIG. 13 is a front elevation of another embodiment of a reciprocatory motion welding machine constructed in accordance with the present invention;

FIG. 14 is an end elevation view of the machine shown in FIG. 13; and

FIG. 15 is a front elevation view of a third embodiment of a reciprocatory motion bonding machine constructed in accordance with the present invention and illustrates a method wherein two separate pairs of parts are bonded simultaneously.

Figure 8:
FIG. 8 is a photomicrograph, enlarged 110 times, of two SAE 1018 steel parts bonded by the machine of FIG. 1 showing the microstructure of the bond and the heat affected zone as compared with the parent metal on each side of the bond zone.

A machine for bonding parts by reciprocating motion and constructed in accordance with one embodiment of the present invention is indicated generally by the reference numeral 21 in FIGS. 1 and 2.

The machine 21 includes a frame 22, drive means, indicated generally by reference numeral 23, for reciprocating one part or workpiece WP1 to be joined, a fixture 24 for holding the other part or workpiece WP2 to be joined, loading means 26 for pressing the parts together at the interface, and balance means 27 for dynamically balancing the motion of the drive means 23.

The drive mechanism 23 includes a motor 28. The motor 28 is mounted by brackets 29 to a mounting plate 31. The mounting plate 31 is supported on frame members 32 of the machine frame 22.

As will be described in greater detail below, the entire motor and subframe 29–31 is adapted to be moved upwardly by lever 33 pivoted at 34 to disconnect the drive from the motor to the part WP1.

The output shaft 36 of the motor is connected to drive a shaft 37 through pulleys 38 and 39 and a belt 41 (as best shown in FIG. 4). The shaft 37 is mounted for rotation on the frame 22 by a plurality of bearing boxes 42, 43 and 44. The bearing boxes 42 and 43 preferably have self-aligning bushings 46.

A brake disc 47 is carried on the shaft 37 between the bearing boxes 42 and 43. Brake blocks 48 (see FIG. 2) can be actuated by a lever 49 and a cam 51 to stop rotation of the shaft 12 at the end of a weld cycle.

The rotary motion of the motor 28 and shaft 37 is converted to reciprocating motion through an eccentric arrangement which is best shown in FIG. 4. An eccentric journal 52 is keyed to the shaft 37 at a location between the bearing box 43 and bearing box 44. An anti-friction bearing 53 encircles the journal 52 and is disposed between the journal 52 and the inner end of a connecting rod 54. The workpiece WP1 is mounted in a block 50 at the other end of the connecting rod 54 by setscrews 56. With this arrangement the connecting rod and part WP1 are caused to reciprocate as the shaft 37 rotates.

The mass of the rod 54 is considerable, and rapid reciprocation can put a substantial load on the drive components.

In accordance with the present invention a balancing mechanism, indicated generally by the reference numeral 27, and including an arm 57, is connected to the drive mechanism to balance the movement of the connecting rod 54. The balance arm 57 is mounted for rotation on an eccentric journal 58 by a bearing 59. The journal 58 is oriented so as to be 180 degrees out of phase with respect to the journal 52. Thus, the arm 57 and connecting rod 54 move at equal speeds but in opposite directions.

The centers of the journals 52 and 58 are offset one-eighth inch with respect to the axis of the shaft 37. Thus, the block 50 moves one-quarter inch in one direction in response to one-half of a revolution of the shaft 37, and returns to the original position in response to the other one-half of a revolution of the shaft.

Spacers 61 maintain the axial alignment of the arms 54 and 57 and related structure on the shaft 37. These two arms are preferably maintained close to one another to minimize bending stresses on the shaft 37.

As best shown in FIG. 2 the outer end of the balance arm 57 is connected to the frame 22 by a pair of springs 62. The springs 62 serve to support the free end of the arm 57. The balance arm 57 moves in opposition to the connecting arm 54. Thus, forces due to acceleration are cancelled in the two arms.

The eccentric and balance arm mechanism is a preferred arrangement. Other equivalent structure, such as a crank and dashpot damper, could be used.

With particular reference now to FIG. 3 the fixture 24 for holding the part WP2 will be described in greater detail.

A pair of V-grooves 63 are formed in the underside of the block 50. Corresponding grooves 64 are formed in the base 67 of the fixture 24, and ball bearings 66 disposed within these grooves permit reciprocation of the block 50. A vertically movable block 68 is provided in the fixture 24 and the part WP2 is mounted in the upper block 68 by setscrews 71. A plurality of spring-biased bearings 69 in fixture 24 engage the upper surface of the block 61 to prevent chatter.

The loading mechanism 26 (see FIG. 1) includes a lever 72 which is pivotally connected at 73 to a bracket 74, which is in turn rigidly connected to the machine frame 22.

The lever 72 has a notch 76 which engages a ridged block 77 attached to the upper side of the block 68 of the fixture 24. Thus, as the lever 72 is pressed downwardly about the pivot 73, the upper block 68 and the part WP2 mounted therein are pressed downwardly so that the part WP2 engages the part WP1.

In the machine shown in FIG. 1 a weight 78 is used to provide the pressure for a heating cycle, and a weight 79 is used to provide an increased pressure for producing an adequate amount of upset and flash at the end of the cycle. The weight 79 is suspended by a rod 81, and the upper end of the rod 81 is formed with a flange or nut 82 which is normally spaced from the lever 72 until the increased upset pressure is desired. At that time an electrically actuated solenoid 83 is energized to retract a pin 84 from a hole in the rod 81 to let the weight 79 drop and engage the lever 72.

The end of the lever 72 has a pawl 86. The pawl engages the teeth of a rack 87 to prevent rebound when the solenoid 83 is energized.

To prevent oxidation of the portions WP1 and WP2 that are exposed during the reciprocating movement an inert gas is directed onto the workpieces through tubes 88 and 89. The arrangement shown in FIG. 1 is effective to provide sufficient shielding without any additional enclosure.

In the operation of the machine thus far described, the parts WP1 and WP2 are mounted in the respective blocks 50 and 68, and the motor 28 is started to rotate the shaft 37 and reciprocate the part WP1. At the start of the bonding operation the lever 72 is held out of engagement with the block 68 so that the parts to be bonded are rubbed together under the load of only the block 68. After a short wear-in period, during which the flow of inert gas from the tubes 88 and 89 is started, the lever 72 is moved to a position where the weight 78 increases the pressure of engagement between the parts WP1 and WP2. The size of the weight 78 is selected to produce an adequate pressure for heating the interface between the parts WP1 and WP2 to a plastic condition under the reciprocation produced by the drive means 23. When the interface has been heated to a plastic condition, the motor 28 is de-energized, and the lever 33 is actuated to lift the motor and disconnect the drive connection between the motor and the shaft 37. At the same time the brake lever 49 is actuated to stop rotation of the shaft 37, and the solenoid 83 is energized to retract the pin 84. This lets the weight 79 engage the lever 72 and increase the pressure of engagement at the interface between the parts WP1 and WP2. The size of weight 79 is selected to increase the pressure to a level where the interface is forged and plastic material is squeezed out of the interface zone as external flash, thus insuring a good bond between the parts.

The following are typical process parameters for forming a bond between two mild steel parts having a rectangular cross section ¼ inch by 1 inch. The eccentric drive shaft may be rotated at 2800 r.p.m. to provide a maximum oscillatory velocity of 3.06 feet per second with ¼ inch total displacement of the part WP1. A heating pressure of 8400 p.s.i. may be applied for about 5 seconds of heating after a wear-in period of 2 or 3 seconds. The pressure may be increased to 22,000 p.s.i. at the end of the cycle.

FIG. 5 is a graph which illustrates the instantaneous power input in watts throughout the bonding cycle. The horizontal portion of the curve indicated by the reference numeral 89 corresponds to the power input during the wear-in period. As the heating load is applied by the application of weight 78, the power input increases sharply to a peak power input as indicated by the substantially vertical portion 91 of the curve. As the interface area is heated to a plastic condition the power input drops slightly as indicated at 92, and from that point on during the heating cycle the power input tends to stabilize as a result of the plastic condition at the interface. During this period, as indicated by the reference numeral 93, the power input may decrease slightly. The forging pressure in the cycle represented by FIG. 5 was applied just prior to de-energizing the motor at point 94 and resulted in a sharp increase in power input represented by peak 96. This increase in power results from the flashing out of the hot material adjacent the interface such that continued reciprocation of the part WP1 requires plastic working of colder, stronger material. As the motor 28 is de-energized the power reduces to zero as indicated by the substantially vertical portion 97 of the curve.

FIGS. 6 and 7 are pictorial views of a bonded part which illustrate the general configurations of the flash FL and the relative size of the heat-affected zone HAZ.

FIGS. 8 through 12 are photomicrographs of parts bonded by the present invention and disclose the microstructure and plastic flow characteristics of material bonded by the present invention.

FIG. 8 is a view across the entire bond zone taken in the direction of the arrows 8—8 in FIG. 7. This view shows the microstructure of the bond zone, including the heat-affected zone, as compared with the parent metal on each side of the bond zone.

FIG. 8 shows that there is a relatively steep temperature gradient between the heated material in the bond zone and the parent metal not affected by heat during the bonding cycle.

FIG. 8 also illustrates the extreme grain refinement achieved due to thermal refinement and working resulting from the reciprocatory motion of the parts during heating and the plastic flow of material during upsetting. The flow lines indicated by the dark streaks in the bond zone show that there is material flow in a direction substantially parallel to the plane of the interface. These flow lines are also substantially parallel to the direction of reciprocating motion during the bonding cycle. Relative motion between the two parts would be in a vertical direction as viewed in FIG. 8.

Figure 9:
FIG. 9 is a photomicrograph, enlarged 200 times, of an area at the right-hand edge of the bond zone as illustrated in FIG. 8.

FIG. 9 is a photomicrograph enlarged 200 times of an area of the right-hand edge of the bond zone as illustrated in FIG. 8. Plastic flow of the material is illustrated by some reorientation of the grain at the extreme left of the photomicrograph in FIG. 9. The right-hand portion of FIG. 9 illustrates the relatively undisturbed grain of the parent metal.

Figure 10:
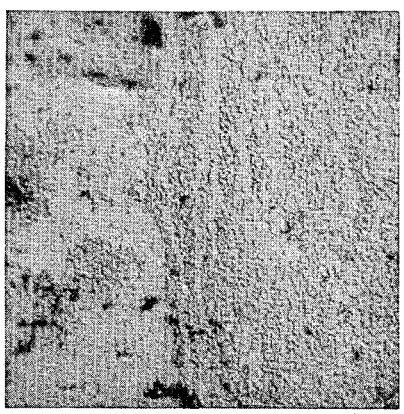
FIG. 10 is a photomicrograph, enlarged 200 times, of an area at the left-hand edge of the heat affected zone shown in FIG. 8.

FIG. 10 is a view enlarged 200 times of an area at the left edge of the bond zone as shown in FIG. 8 and also discloses some of the grain structure of the undisturbed parent metal. This view also illustrates the rather abrupt transition from the heat-affected and plastically worked zone of material to the relatively undisturbed grain structure of the parent metal.

Figure 11:
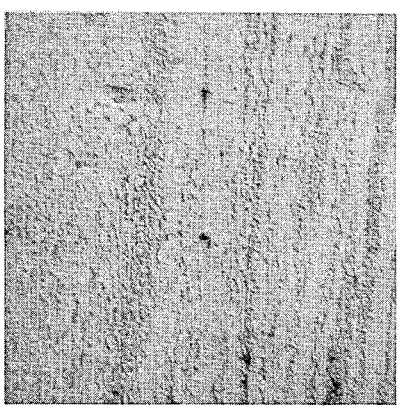
FIG. 11 is a photomicrograph, enlarged 200 times, of an area extending from the outer edge of the heat affected zone to approximately the weld interface.

FIG. 11 is a photomicrograph enlarged 200 times of an area extending from the outer edge of the heat-affected zone to approximately the interface and illustrates the severe grain refinement and material reorientation resulting from plastic flow of the material during the reciprocating motion and upset portion of the bond cycle.

Figure 12:
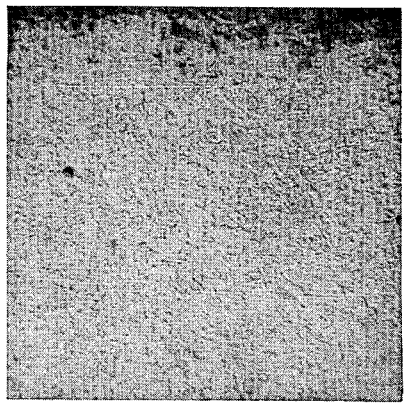
FIG. 12 is a photomicrograph, enlarged 200 times, in the area of the weld interface.

FIG. 12 is a photomicrograph enlarged 200 times taken in the area of the interface and illustrates the extreme grain refinement which occurs at that location due to thermal refinement and the substantial amount of plastic working.

The particular microstructure and material reorientation as illustrated in FIGS. 8 through 12 results in a high strength bond of a ductile nature. Tensile tests of a series of bonded specimens resulted in failure of the parent metal away from the joint region. In addition, considable elongation of the part was experienced prior to failure.

FIGS. 13 and 14 show another form of a bonding machine, indicated generally by the reference numeral 100, constructed in accordance with the present invention.

The machine 100 includes a frame 22, drive means 23, a fixture 24, loading means 26, and balance means 27 which are generally similar to the corresponding mechanism of the machine 21 shown in FIGS. 1 through 4 and described above. The parts of the machine 100 which correspond to the machine 21 are indicated by corresponding reference numerals.

In the machine shown in FIGS. 13 and 14 the motor 28 is mounted for sliding movement in frame members 101. A spring 102 normally biases the motor 28 to the left to provide adequate tension in the belt 41 for the motor to rotate the drive shaft 37. A cyclinder 103 having a piston rod 104 is pivotally connected between the frame 22 and the motor 28. With this arrangement as the contact surfaces of the parts being bonded reach a bondable condition, pressurized fluid is applied to the cylinder 103 to extend the rod 104 and shove the motor 28 to the right as viewed in FIG. 13. This disconnects the drive between the motor 28 and the drive shaft 37.

The load applying means 26 include a roto-chamber 106 which replaces the weights 78 and 79 of the machine shown in FIG. 1. Air pressure supplied to the roto-chamber 106 is effective to supply whatever contact pressure is desired between the parts WP1 and WP2 and in whatever sequence is desired.

As best shown in FIG. 14, the brake 49 is actuated by a solenoid 107.

The cylinder 103, roto-chamber 106, and solenoid 107 are automatically controlled by a timer mechanism in the machine shown in FIGS. 13 and 14, but can be actuated either manually or in response to other process parameters if desired.

In FIG. 15 another machine constructed in accordance with the present invention is indicated generally by the reference numeral 201. In the machine shown in FIG. 15 the balance means comprise a fixture 24' which is identical to the fixture 24 described in detail with reference to FIG. 1 and which is connected to the balance arm 57 so as to produce working forces which are equal to and oppositely directed to the working forces produced in the fixture 24. Performing two bonds simultaneously on the parts WP1 and WP2 and WP1' and WP2' with the machine shown in FIG. 15 provides an effective balance of forces on the drive shaft 37 and also increases the productive capacity of the machine.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A machine for bonding metal parts across a common interface by engaging the parts in reciprocatory rubbing contact to heat the interface to a bondable condition through the friction and working developed by the rubbing contact and comprising, loading means for pressing the parts together at the interface, drive means for moving the parts in relative reciprocatory motion under the load applied by the loading means, and balance means for dynamically balancing the acceleration forces produced by the motion of the drive means.

2. A machine as defined in claim 1 wherein the balance means include second drive means connected to move in opposition to the first drive means and effective to produce a bond between two additional parts simultaneously with the forming of the bond between the first two parts.

3. A machine as defined in claim 1 wherein the parts are reciprocated about one-quarter inch at a frequency greater than 40 cycles per second.

4. A machine as defined in claim 1 including decoupling means for decoupling the drive means from the parts and a brake for stopping motion of the parts as the increased load is applied.

References Cited

UNITED STATES PATENTS 3,269,002   8/1966   Hollander _____ 29—470.3

FOREIGN PATENTS 149,296   10/1960   Russia.
963,688   7/1964   Great Britain.

RICHARD H. EANES, JR., *Primary Examiner.*